United States Patent

Mukaino

Patent Number: 6,111,854
Date of Patent: Aug. 29, 2000

[54] INTELLIGENT NETWORK CONGESTION CONTROL SYSTEM

[75] Inventor: Masahiro Mukaino, Tokyo, Japan

[73] Assignee: NEC Corporation, Tokyo, Japan

[21] Appl. No.: 08/884,163

[22] Filed: Jun. 27, 1997

[30] Foreign Application Priority Data

Jul. 3, 1996 [JP] Japan ................................ 8-173539

[51] Int. Cl.[7] ........................... G01R 31/08; G06F 11/00; G08C 15/00
[52] U.S. Cl. ........................................ 370/229; 370/235
[58] Field of Search .................................. 370/230, 231, 370/232, 233, 234, 252, 253, 410, 522; 379/221, 220, 111, 113

[56] References Cited

U.S. PATENT DOCUMENTS

| 4,979,118 | 12/1990 | Kheradpir | 364/436 |
| 5,867,565 | 2/1999 | Morikawa | 379/113 |

FOREIGN PATENT DOCUMENTS

| 07212463 | 8/1995 | Japan . |
| 7-212463 | 8/1995 | Japan . |

*Primary Examiner*—Huy D. Vu
*Assistant Examiner*—M. Phan
*Attorney, Agent, or Firm*—Foley Lardner

[57] ABSTRACT

An intelligent network congestion control system includes a reception message counting section, a comparing section, an SSP capacity storage section, a message destination selecting section, and a regulation instructing section. The reception message counting section measures the rate of occurrence of all service requests generated by electronic exchanges. The comparing section checks at predetermined periods whether the rate of occurrence measured by the reception message counting section exceeds a predetermined allowable value. The SSP capacity storage section stores weight data on the respective electronic exchanges. The message destination selecting section selects an electronic exchange as a destination of a message on the basis of at least the weight data read out from the SSP capacity storage section when the comparing section determines that the rate of occurrence exceeds the allowable value. The regulation instructing section transmits a regulation instruction message for instructing the electronic exchange selected by the message destination selecting section to regulate transmission of service requests.

16 Claims, 4 Drawing Sheets

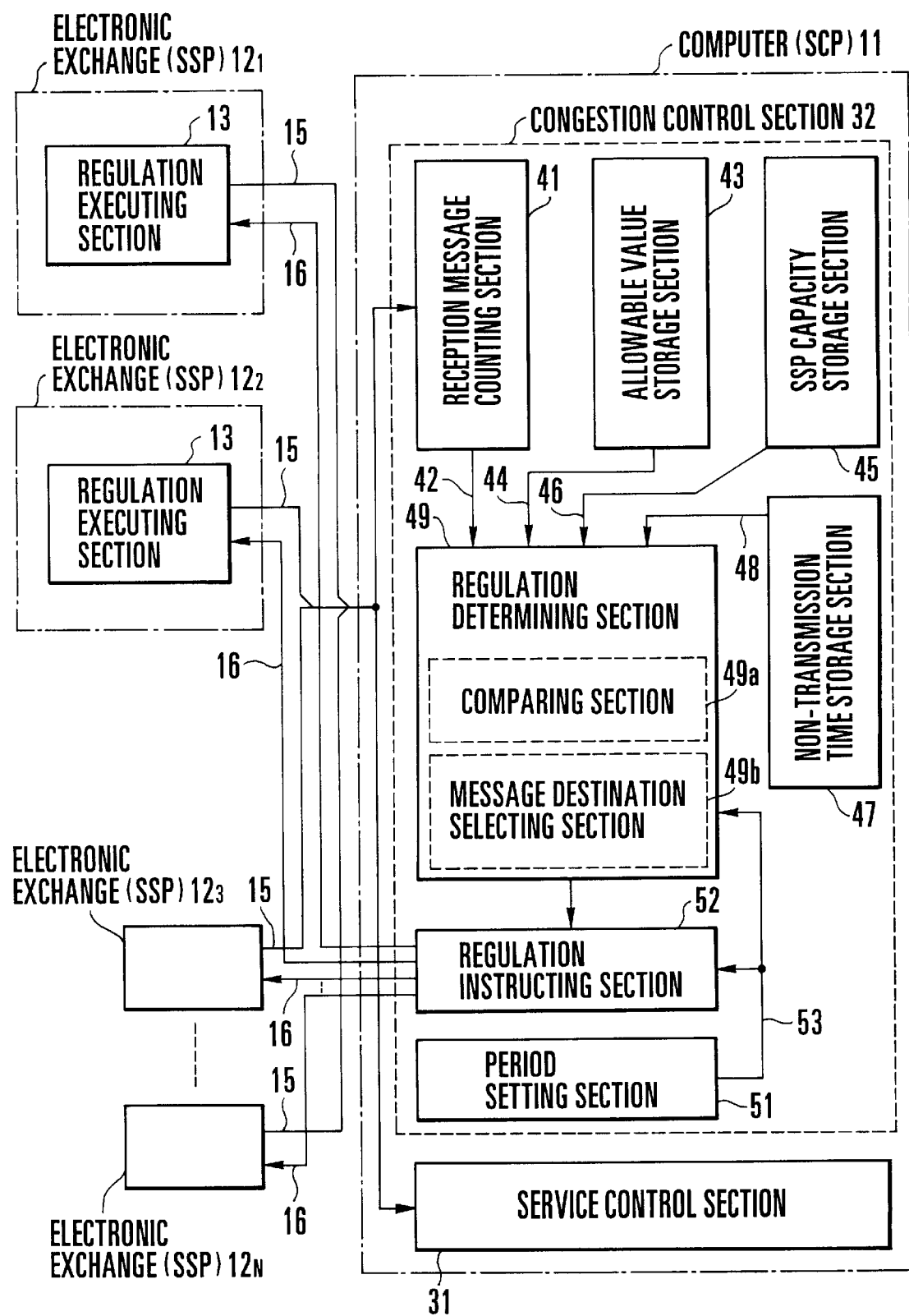
F I G. 1

| 45 | |
|---|---|
| FIRST SSP | 2 |
| SECOND SSP | 1 |
| THIRD SSP | 3 |
| ⋮ | ⋮ |
| iTH SSP | P |
| ⋮ | ⋮ |
| NTH SSP | 1 |

FIG. 3

| 47 | |
|---|---|
| FIRST SSP | 1 |
| SECOND SSP | 0 |
| THIRD SSP | 1 |
| ⋮ | ⋮ |
| iTH SSP | t |
| ⋮ | ⋮ |
| NTH SSP | 0 |

FIG. 4

INTELLIGENT NETWORK CONGESTION CONTROL SYSTEM

BACKGROUND OF THE INVENTION

The present invention relates to an intelligent network congestion control system for controlling congestion that occurs in an intelligent network constituted by electronic exchanges and a computer and, more particularly, to an intelligent network congestion control system suitable for a case in which a plurality of electronic exchanges are connected to one computer.

In an intelligent network system constituted by electronic exchanges for performing switching connection upon reception of calls, and a computer for performing service control on the electronic exchanges, when electronic exchanges as SSPs (Service Switching Points) transmit service request messages to the computer as an SCP (Service Control Point) in large quantities in a given period, the load on the computer increases. For this reason, an intelligent network congestion control system has been proposed, in which the computer transmits a regulation instruction to an electronic exchange to regulate the transmission of service request messages.

In the conventional congestion control system, when the computer transmits a regulation instruction containing a predetermined condition to an electronic exchange, the transmission of service request messages is regulated by a gaping scheme on the electronic exchange side. That is, message transmission from the electronic exchange to the computer is regulated completely in a given predetermined period (gap). The transmission of a service request message to the computer is permitted in response to only a call received by an electronic exchange for the first time after the end of regulation. Thereafter, the next gap control is performed in the same manner as described above.

In such a congestion control system, however, it is difficult to determine the optimal gap. In addition, when one computer performs service control on a plurality of electronic exchanges, the service request messages transmitted from the respective electronic exchanges to the computer often vary in number. In this case, if the respective electronic exchanges are uniformly regulated, an expected regulation effect may not be obtained.

Under the circumstances, Japanese Patent Laid-Open No. 7-212463 discloses a congestion control system which can obtain a satisfactory regulation effect even if the service request messages transmitted from a plurality of electronic exchanges to one computer vary in number when the computer performs service control on the electronic exchanges. In this congestion control system, when a large number of service request messages are generated with respect to the computer, the computer transmits regulation instruction messages to all the electronic exchanges in accordance with the number of service request messages received. On the electronic exchange side, a regulation, e.g., decreasing the number of service request messages transmitted to the computer, is performed in accordance with the regulation instruction message.

In this intelligent network congestion control system, as the number of electronic exchanges which transmit service request messages to the computer increases, the number of regulation instruction messages transmitted from the computer to the electronic exchanges increases. Consequently, in transmitting regulation instruction messages, the loads on the computer and the lines between the computer and the electronic exchanges increase.

SUMMARY OF THE INVENTION

It is an object of the present invention to provide an intelligent network congestion control system which can restrain the load on the computer side when many electronic exchanges transmit service request messages to the computer.

In order to achieve the above object, according to the present invention, there is provided an intelligent network congestion control system comprising measuring means for measuring a rate of occurrence of all service requests generated by a plurality of electronic exchanges, determining means for checking at predetermined periods whether the rate of occurrence measured by said measuring means exceeds a predetermined allowable value, first storage means storing weight data on said respective electronic exchanges, destination selecting means for selecting an electronic exchange as a destination of a message on the basis of at least the weight data read out from said first storage means when said determining means determines that the rate of occurrence exceeds the allowable value, and message transmitting means for transmitting a regulation instruction message for instructing said electronic exchange selected by said destination selecting means to regulate transmission of service requests.

BRIEF DESCRIPTION OF THE DRAWINGS

FIG. 1 is a block diagram showing an intelligent network congestion control system according to an embodiment of the present invention;

FIG. 3 is a view showing the stored contents of an SSP value storage section in FIG. 1;

FIG. 4 is a view showing the stored contents of a non-transmission time storage section in FIG. 1.

DESCRIPTION OF THE PREFERRED EMBODIMENT

The present invention will be described in detail below with reference to the accompanying drawings.

FIG. 1 shows an intelligent network congestion control system according to an embodiment of the present invention. The system shown in FIG. 1 comprises a computer (SCP) 11 and a plurality of electronic exchanges (SSPS) $12_1$, $12_2$, ..., $12_N$ connected to the computer 11. Each of the first to Nth electronic exchanges $12_1$, $12_2$, ..., $12_N$ includes a regulation executing section 13.

Figure 2:
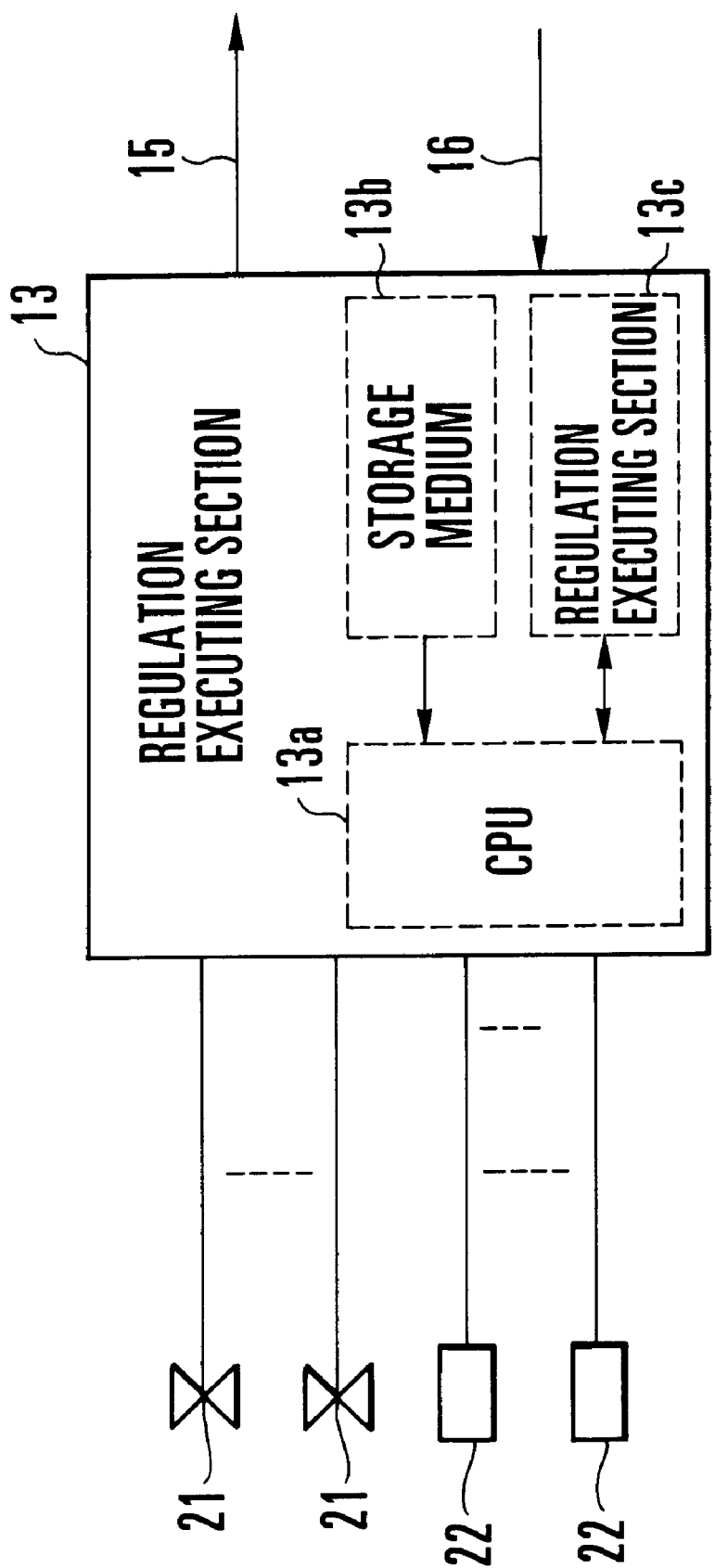
FIG. 2 is a view showing the arrangement of a regulation executing section and its peripheral connection configuration.

FIG. 2 shows the connection configuration of the regulation executing section 13. A plurality of subscribers 21 and a plurality of input trunks 22 are connected to the regulation executing section 13 connected to the computer 11 in FIG. 1 through a switched network. The regulation executing section 13 includes a CPU (Central Processing Unit) 13a, a storage medium 13b such as a magnetic disk storing the programs executed by the CPU 13a, and a communication control section 13c for performing communication control. Note that the CPU 13a may be shared by the electronic exchanges $12_1$, $12_2$, ..., $12_N$. The regulation executing section 13 outputs a service request message 15 to the computer 11, and receives a regulation instruction message 16 from the computer 11 under a predetermined condition.

Referring to FIG. 1, the computer 11 includes a service control section 31 for executing services and a congestion control section 32 for performing congestion control. The service control section 31 has the function of executing various services for the electronic exchanges $12_1, 12_2, \ldots, 12_N$ in accordance with the received service request messages 15, a detailed description thereof will be omitted.

The congestion control section 32 includes a reception message counting section 41 for counting all the service request messages 15 received from the electronic exchanges $12_1, 12_2, \ldots, 12_N$, an allowable value storage section 43 for storing an allowable value 44, an SSP capacity storage section 45 for storing weight information 46 corresponding to the capacity of each of the electronic exchanges $12_1, 12_2, \ldots, 12_N$, a non-transmission time storage section 47 for storing regulation instruction non-transmission time information 48 about each of the electronic exchanges $12_1, 12_2, \ldots, 12_N$, a regulation determining section 49 including a comparing section 49a and a message destination selecting section 49b and designed to determine the necessity of regulation every time period information 53 is received, a period setting section 51 for outputting the period information 53 to the regulation determining section 49, and a regulation instructing section 52 for instructing each of the electronic exchanges $12_1, 12_2, \ldots, 12_N$ to execute regulation at the timing of the period information 53 in accordance with the determination result obtained by the regulation determining section 49.

The regulation determining section 49 receives a count value 42 of the reception message counting section 41 which is counted within a unit period defined by the period information 53, the allowable value 44 read out from the allowable value storage section 43, the weight information 46 corresponding to the capacity of each of the electronic exchanges (SSPs) $12_1, 12_2, \ldots, 12_N$, and the regulation instruction non-transmission time information 48 about each of the electronic exchanges $12_1, 12_2, \ldots, 12_N$, read out from the non-transmission time storage section 47, and determines the necessity of regulation including selection of a message destination on the basis of the four pieces of input information 42, 44, 46, and 48 every time the period information 53 is received. The regulation instructing section 52 transmits the regulation instruction message 16 to the electronic exchange, in the electronic exchanges $12_1, 12_2, \ldots 12_N$, which is subjected to regulation within the period defined by the period information 53 in accordance with the determination result obtained by the regulation determining section 49.

FIG. 3 shows the stored contents of the SSP capacity storage section 45. The SSP capacity storage section 45 stores the capacities of the first to Nth electronic exchanges (SSPs) $12_1, 12_2, \ldots, 12_N$ in the form of integers equal to or more than "1". In this case, capacity "1" is the largest weight, and capacity "P" generally corresponds to 1/P capacity "1". Referring to FIG. 3, the largest weights are assigned to the second and the Nth electronic exchanges $12_2$ and $12_N$ indicated by capacity "1".

FIG. 4 shows the stored contents of the non-transmission time storage section 47. The non-transmission time storage section 47 stores the number of times "t" a regulation instruction is not output in correspondence with each of the electronic exchanges (SSPS) $12_1, 12_2, \ldots, 12_N$ in the intelligent network congestion control system of this embodiment, when the sum of the number of times "t" and the constant "2" exceeds capacity "P" stored in the SSP capacity storage section 45, the regulation instruction message 16 is output to the corresponding electronic exchange.

At this time, the number of times "t" a regulation instruction is not output to the electronic exchange to which the regulation instruction message 16 has been output is cleared to "0".

To be utilized as the SSP capacity storage section 45 in FIG. 3 and the non-transmission time storage section 47 in FIG. 4, storage areas such as a first memory (not shown) in the computer 11 can be assigned. The computer 11 also has a second memory (not shown) in which programs for realizing the following control operations are stored. The CPU (not shown) executes the programs stored in the second memory to operate the congestion control system.

Figure 5:
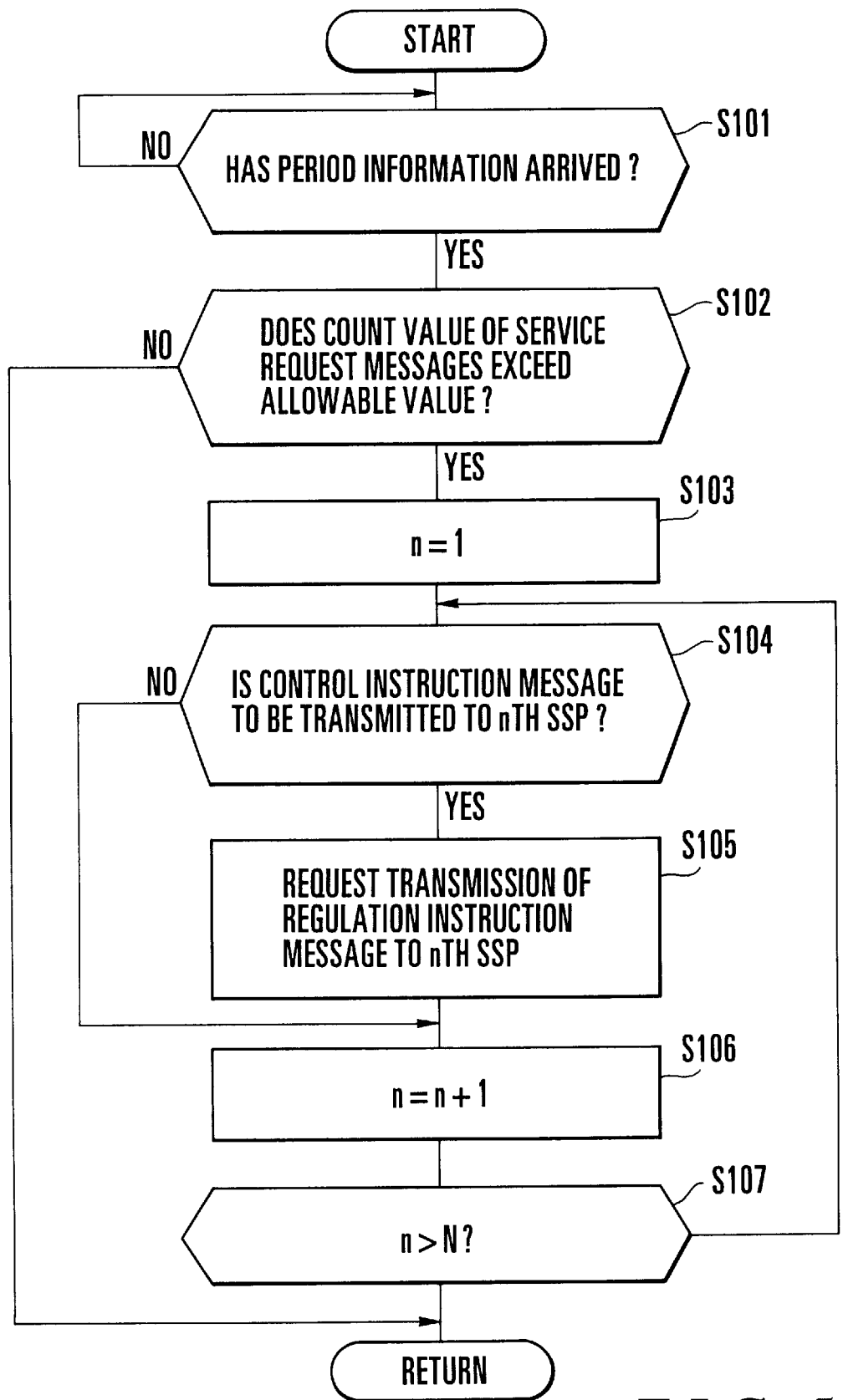
FIG. 5 is a flow chart showing a control operation for regulation necessity determination on the computer (SCP) side.

FIG. 5 shows the control operation of the regulation determining section 49 of the computer 11. Referring to FIG. 5, the comparing section 49a of the regulation determining section 49 monitors the arrival of the period information 53 from the period setting section 51 (step S101). Upon arrival of the period information 53, it is checked whether the count value 42 of the reception message counting section 41 for counting the received service request messages 15 exceeds the allowable value 44 stored in the allowable value storage section 43 (step S102). If it is determined in step S102 that the count value 42 of the service request messages 15 is equal to or smaller than the allowable value 44, since no excessive load is imposed on the computer 11, the processing is complete without issuing the regulation instruction message 16. The regulation determining section 49 then prepares for the next period information 53.

If it is determined in step S102 that the service request messages 15 larger in number than the allowable value 44 have arrived within the unit period, the message destination selecting section 49b initializes the numerical value "n" designating an electronic exchange to "1" (step S103), and checks whether to transmit the regulation instruction message 16 to the first electronic exchange $12_1$, (step S104). In performing the determination processing in step S104, the message destination selecting section 49b checks whether the value "t+2" calculated from the number of times a regulation instruction is not output is larger than capacity "P". In the case shown in FIGS. 3 and 4, the number of times "t" a regulation instruction is not output to the first electronic exchange $12_1$, is "1", and the value "3" obtained by adding the numerical value "2" to the number of times "t" is larger than capacity "2" as a weight. The message destination selecting section 49b therefore determines that the regulation instruction message 16 should be transmitted to the first electronic exchange $12_1$. The regulation determining section 49 therefore requests the regulation instructing section 52 to transmit the regulation instruction message 16 to the first electronic exchange $12_1$ (step S105). Thereafter, the numerical value "n" is incremented by "1" (step S106).

If it is determined in step S104 that the regulation instruction message 16 need not be transmitted to the first electronic exchange $12_1$, the regulation determining section 49 immediately performs the processing in step S106 without performing the processing in step S105. When the numerical value "n" is incremented by "1" in step S106, it is checked whether the incremented numerical value "n" becomes larger than "N" (step S107). If the numerical value "n" is not larger than "N", since determination of the necessity of transmitting the regulation instruction message 16 is not complete with respect to all the first to Nth electronic exchanges $12_1, 12_2, \ldots, 12_N$, the flow returns to step S104 to perform the same determination with respect to the second electronic exchange $12_2$. In this embodiment, capacity "P" of the second electronic exchange $12_2$ is "1", which is the largest weight. For this reason, transmission of the regulation instruction message 16 is always requested in a period in which reception messages larger in number than the allowable value 44 have arrived.

In this manner, similar determination processing is repeated up to the Nth electronic exchange $12_N$. If it is determined in step S107 that the processing for the Nth electronic exchange $12_N$ is complete, all the processing is terminated. The computer 11 is set in the standby state until the next period information 53 is generated in step S101.

Upon reception of the regulation instruction message 16, whose destination is limited in this manner, a corresponding one of the first to Nth electronic exchanges $12_1, 12_2, \ldots, 12_N$ restrains the rate of the transmission of the service request messages 15 in accordance with the regulation instruction message 16.

In the above embodiment, the weights corresponding to the capacities of the electronic exchanges $12_1, 12_2, \ldots 12_N$ are stored in the SSP capacity storage section 45 of the computer 11. However, weight data other than those corresponding to the capacities may be stored. For example, weights set in consideration of the importance of each electronic exchange may be used. In addition, the weight data may be changed depending on the time zones or the like.

As has been described above, according to the present invention, since the load associated with transmission can be reduced by decreasing the number of times a regulation instruction is transmitted from the service controller side, e.g., the computer side, the processing power can be effectively assigned to the call processing of the service control section.

In addition, the weight data stored in the weight data storage means can be set in accordance with the state of the respective electronic exchanges. Therefore, by intentionally changing the rate of transmission of service request messages from each electronic exchange using a regulation instruction message, the distribution of services can be made substantially uniform as compared with the conventional intelligent network congestion control system in which regulation instruction messages are simply transmitted.

What is claimed is:

1. An intelligent network congestion control system comprising:

measuring means for measuring a rate of occurrence of all service requests generated by a plurality of electronic exchanges;

allowable value storage means for storing a predetermined allowable value;

determining means for checking at predetermined periods whether the rate of occurrence measured by said measuring means exceeds said predetermined allowable value stored in said allowable value storage means;

first storage means storing weight data on said respective electronic exchanges;

destination selecting means for selecting an electronic exchange as a destination of a message on the basis of at least the weight data read out from said first storage means when said determining means determines that the rate of occurrence exceeds the predetermined allowable value;

message transmitting means for transmitting a regulation instruction message for instructing said electronic exchange selected by said destination selecting means to regulate transmission of service requests;

a second storage means for storing a non-transmission time of a regulation instruction message for each of said electronic exchanges, and wherein when said determining means determines that the rate of occurrence exceeds the predetermined allowable value, said destination selecting means selects an electronic exchange as a destination of a regulation instruction message on the basis of the weight data stored in said first storage means and the non-transmission times stored in said second storage means.

2. A system according to claim 1, wherein said first storage means stores weight data constituted by a weight represented by a positive integer "P," wherein P is an integer of not less than 1, having "1" representing a largest weight, said second storage means stores, as a non-transmission time, a number of times "t," wherein t is an integer of not less than 1, of periods in which no regulation instruction messages are transmitted to said electronic exchanges, and said destination selecting means selects, as a destination of a regulation instruction message, said electronic exchange in which "t+2" becomes larger than "P".

3. A system according to claim 1, wherein said measuring means comprises counting means for counting all service requests requested by said electronic exchanges in each period, and said determining means periodically checks whether a count value of said counting means exceeds a predetermined allowable value.

4. A system according to claim 1, wherein said first data storage means stores weight data corresponding to a capacity of each of said electronic exchanges.

5. A system according to claim 1, wherein said first data storage means stores weight data corresponding to importance of each of said electronic exchanges.

6. A system according to claim 1, further comprising period signal generating means for generating period signals at predetermined periods, and wherein said determining means performs determination processing every time a period signal is generated by said period signal generating means, and said destination selecting means and said message transmission means respectively perform a selecting operation and a transmitting operation within a period represented by each period signal.

7. A system according to claim 1, wherein said first storage means stores weight data corresponding to time zones.

8. A system according to claim 1, wherein only one electronic exchange is selected by said destination selecting means.

9. A method of intelligent network congestion control comprising the steps of:

measuring a rate of occurrence of a plurality of service requests generated by a plurality of electronic exchanges;

storing a predetermined allowable value;

checking at predetermined periods whether said measured rate of occurrence exceeds said predetermined allowable value;

storing weight data on said respective electronic exchanges;

selecting at least one of said plurality of electronic exchanges as a destination of a message, on the basis of at least said stored weight data, in response to a determination that said rate of occurrence exceeds said allowable value;

transmitting a regulation instruction message to regulate transmission of said service requests;

storing a non-transmission time of a regulation instruction message, and determining if said rate of occurrence exceeds said allowable value, and if so, then selecting at least one of said plurality of electronic exchanges as a destination of a regulation instruction message, on the basis of said stored weight data and said stored non-transmission times.

10. A method of intelligent network congestion control as recited in claim 9, further comprising the steps of:

storing said weight data that constituted by a weight represented by a positive integer "P," wherein P is an integer of not less than 1, and having "1" representing a largest weight, storing, as a non-transmission time, a number of times "t," wherein t is an integer of not less than 1, of periods in which no regulation instruction messages are transmitted, and selecting, as a destination of a regulation instruction message, said destination in which "t+2" becomes larger than "P."

11. A method of intelligent network congestion control as recited in claim 9, wherein said measuring step comprises counting all service requests requested in each period, and said checking step comprises periodically checking whether a count value exceeds said predetermined allowable value.

12. A method of intelligent network congestion control as recited in claim 9, wherein said stored weight data corresponds to a capacity of each of said destinations.

13. A method of intelligent network congestion control as recited in claim 9, wherein said stored weight data corresponds to the importance of each of said destinations.

14. A method of intelligent network congestion control as recited in claim 9, further comprising the steps of:

generating period signals at predetermined periods, wherein said checking step comprises performing determination processing every time a period signal is generated, and wherein said destination selecting step and said message transmission step respectively perform a selecting operation and a transmitting operation within a period represented by each period signal.

15. A method of intelligent network congestion control as recited in claim 9, wherein said stored weight data corresponds to time zones.

16. A method of intelligent network congestion control as recited in claim 9, wherein said destination selecting step comprises selecting only one electronic exchange destination.

* * * * *